US007434504B2

(12) United States Patent
Fanaletti

(10) Patent No.: US 7,434,504 B2
(45) Date of Patent: Oct. 14, 2008

(54) CYLINDER FOR PRESSURISED FLUIDS

(75) Inventor: Franco Fanaletti, Via D. Alighieri, 3 Castelsangiovanni (IT) I-29015

(73) Assignee: Franco Fanaletti, Castelsangiovanni (IT)

( * ) Notice: Subject to any disclaimer, the term of this patent is extended or adjusted under 35 U.S.C. 154(b) by 150 days.

(21) Appl. No.: 11/541,667

(22) Filed: Oct. 3, 2006

(65) Prior Publication Data

US 2007/0079700 A1 Apr. 12, 2007

(30) Foreign Application Priority Data

Oct. 6, 2005 (IT) .......................... PC2005A0052

(51) Int. Cl.
*F16J 13/00* (2006.01)
*F16J 10/00* (2006.01)

(52) U.S. Cl. ....................................... 92/164; 92/169.1

(58) Field of Classification Search .................. 92/164, 92/169.1
See application file for complete search history.

(56) References Cited

U.S. PATENT DOCUMENTS

| | | | | |
|---|---|---|---|---|
| 4,167,134 | A * | 9/1979 | Yuda | 92/163 |
| 6,101,922 | A * | 8/2000 | King | 92/164 |
| 6,761,105 | B2 * | 7/2004 | Keaton | 92/164 |
| 7,350,453 | B1 * | 4/2008 | Bailey et al. | 92/169.1 |

* cited by examiner

*Primary Examiner*—Thomas E Lazo
(74) *Attorney, Agent, or Firm*—Young & Thompson

(57) ABSTRACT

A Cylinder for pressurized fluids, such as oil, air or the like, including of a cylindrical nozzle and a pair of heads designed to be attached to the ends of the nozzle, characterized in that two annular grooves are made partly in the cylinder liner and partly in each of the two heads for the purpose of locking the heads, and that elements designed to be inserted into the grooves to lock the heads into position are filled. In particular the locking elements are constituted by roller bearings the axis of which is parallel to the axis of the nozzle and which engage with the walls of the grooves, preventing axial movements of the heads in relation to the nozzle. Preferably the grooves are made partly on the inner surface of nozzle and partly on the outer surface of a head element which is inserted into the nozzle.

19 Claims, 4 Drawing Sheets

CYLINDER FOR PRESSURISED FLUIDS

This invention relates to a cylinder designed to contain pressurised fluids such as air, oil or the like, which consists of a cylindrical nozzle and a pair of heads fitted at the ends of said nozzle, characterised in that it includes two annular tracks, made partly in the cylinder liner and partly in each of the two heads, and that said tracks contain suitable head-locking means. Said means, in particular roller bearings, are inserted into the tracks through an open-ended hole in the cylinder liner.

The cylinders for pistons and the like currently on the market usually consist of a cylindrical nozzle and a pair of heads fitted to the ends thereof; however, unlike the cylinder according to the invention, the method used to couple the heads to the cylinder presents considerable limitations.

A first method according to the prior art involves connecting the heads by welding: a weld bead is deposited in the strike area between the head and the end of the nozzle.

However, said system generates problems, because heat stresses deform the structure; this means that certain processes, such as lathe-turning, must be performed when the cylinder has already been fitted with the heads, which involves considerable practical difficulties.

A second method according to the prior art uses two threaded heads which are screwed into a threaded cylinder nozzle.

The problem which arises in this case is that the higher the pressures at which the cylinder operates, the larger the thread area must be; moreover, said system involves additional costs due to the need for further machining and complicated assembly.

Another solution, again in accordance with the known technology, involves the use of special tie-bars to lock the head and cylinder assembly.

Said tie-bars consist of stud bolts inserted in open-ended holes in both the heads, fixing nuts being screwed onto said bolts.

Once again, there is a cost increase due to the presence of numerous parts, and assembly is more complicated; for example, a torque wrench must be used to ensure correct tightening of the stud bolts.

Another very important aspect that none of said devices are very versatile. For example, it is sometimes necessary to rotate a head to change the position of the union that introduces the fluid into the cylinder, or as a result of changes in the configuration of the unit in which it is installed.

This is impossible with the cylinders currently on the market, because they are designed and manufactured for a specific application, and it would be difficult to adapt them to different configurations; the whole assembly therefore needs to be replaced.

To eliminate these drawbacks, the present invention provides a new cylinder for pressurised fluids, consisting of a nozzle closed by two heads positioned at its ends, characterised in that it includes, for the purpose of locking the heads, two annular tracks made partly in the cylinder liner and partly in each of the two heads; means such as roller bearings, ball bearings or the like can be inserted in each of the two heads to occupy the hollow volume of the annular track, thus preventing the relative movement of the two parts along the longitudinal axis, and ensuring that the assembly remains locked.

The cylinder liner therefore contains a hole of suitable size for the insertion of said means.

This invention will now be described in detail, by way of example but not of limitation, by reference to the annexed figures wherein.

Figure 1:
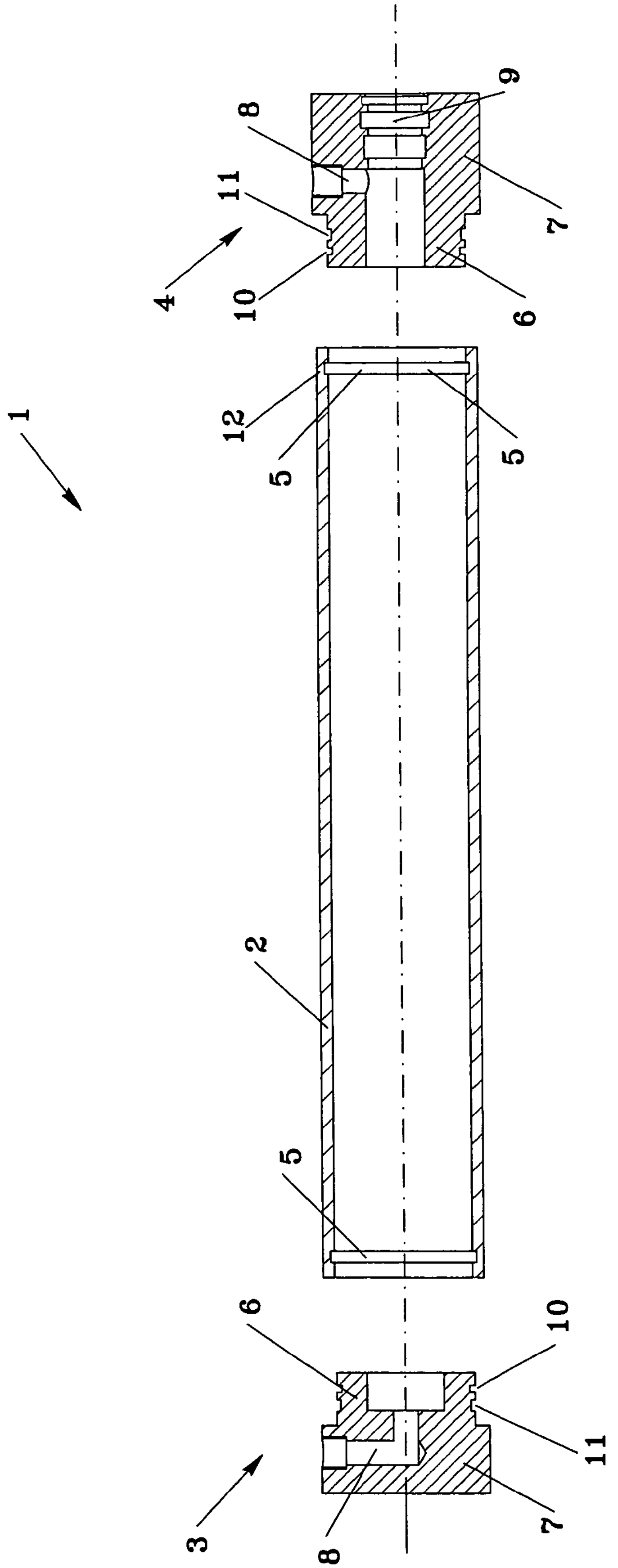
FIG. 1 shows a cross-section of the nozzle and the heads according to the invention, with the components separated.

As shown in FIG. 1, cylinder 1 according to the invention consists of a cylindrical nozzle 2 and a pair of heads 3 and 4.

A pair of annular tracks 5, preferably with a rectangular cross-section, are fitted close to the ends of the nozzle.

Heads 3 and 4 each comprise a section 6 designed to be inserted into nozzle 2 and an outer part 7, of larger diameter, which closes the cylinder at the head.

There is also a nozzle 8 for the passage of pressurised fluid, and a hole 9 for a piston rod in at least one of the heads.

Each of the head sections designed to be inserted into nozzle 2 contains a first annular groove 10, designed to receive a gasket such as an O-ring or the like, which guarantees the hydraulic seal between the head and the nozzle when the two parts have been assembled, and a second annular groove 11 having the same width as groove 5 on the inner wall of the nozzle, positioned in such a way as to match the latter when section 6 of the head is inserted into the nozzle.

Means 13, such as roller bearings, ball bearings or the like, are inserted through an open-ended hole 12 in the nozzle wall at tracks 5, to secure the heads.

Figure 2:
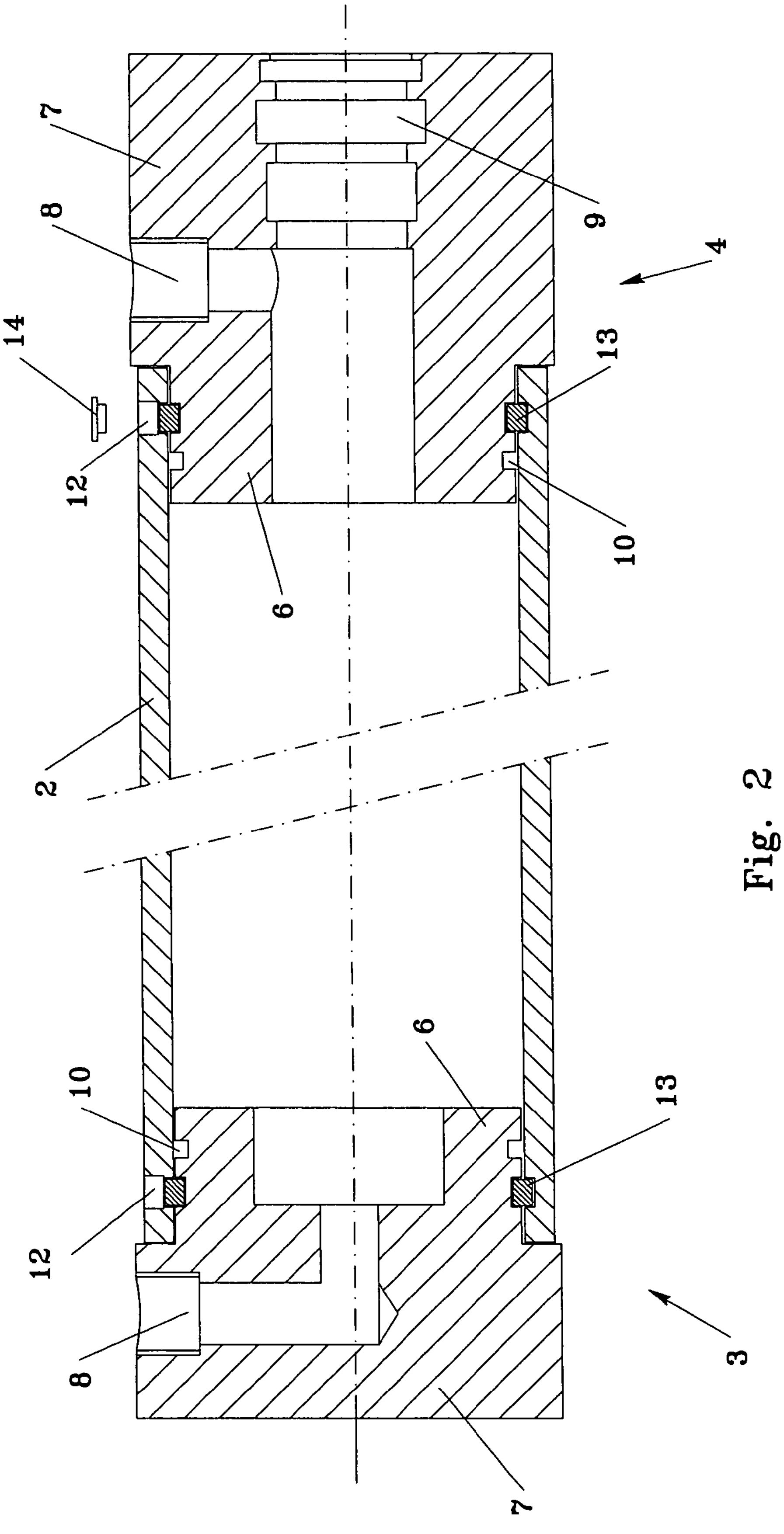
FIG. 2 shows a cross-section of the assembly with the nozzle and heads assembled, according to the invention.
Figure 3:
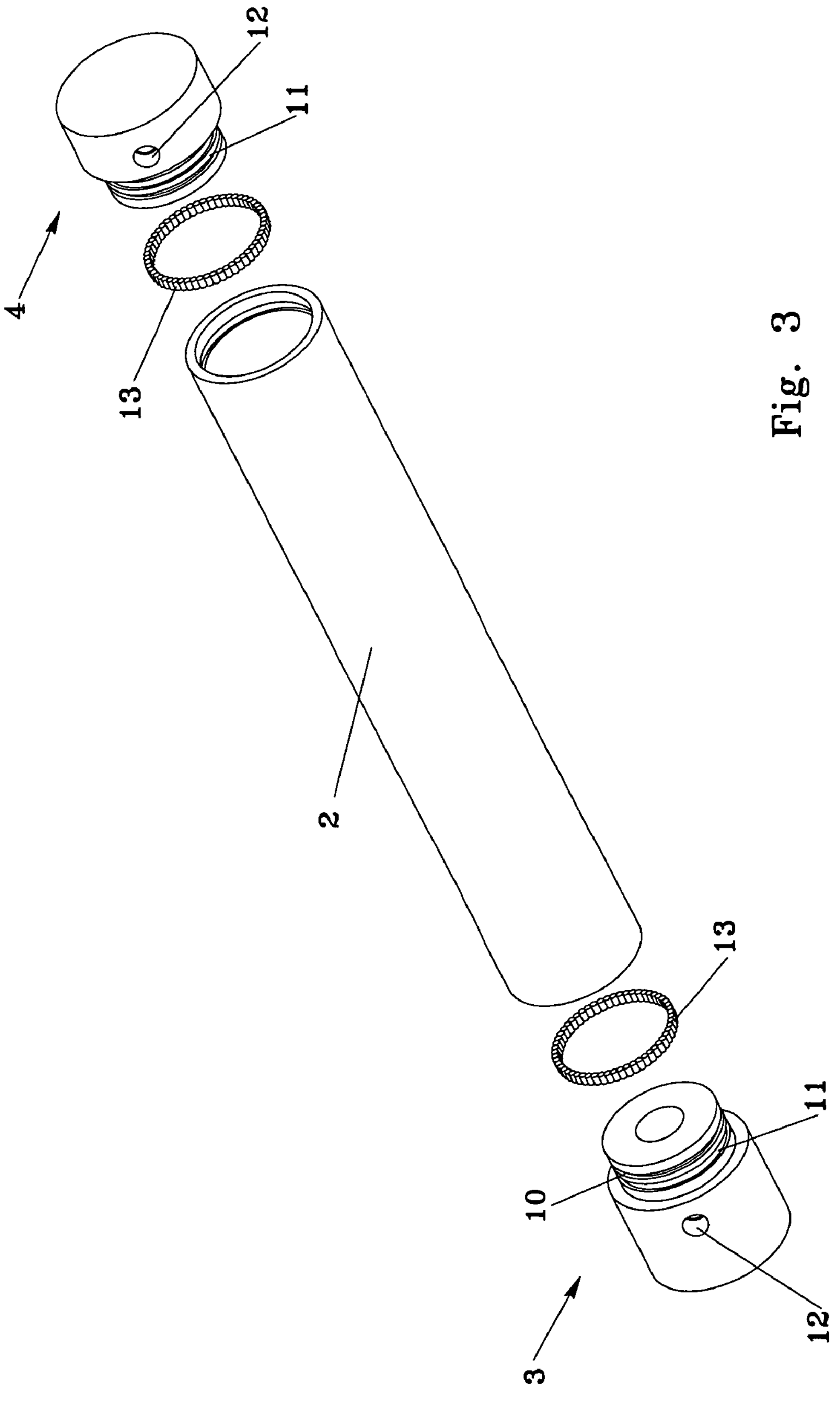
FIG. 3 is an exploded view of the assembly comprising nozzle, heads and locking means according to the invention.
Figure 5:
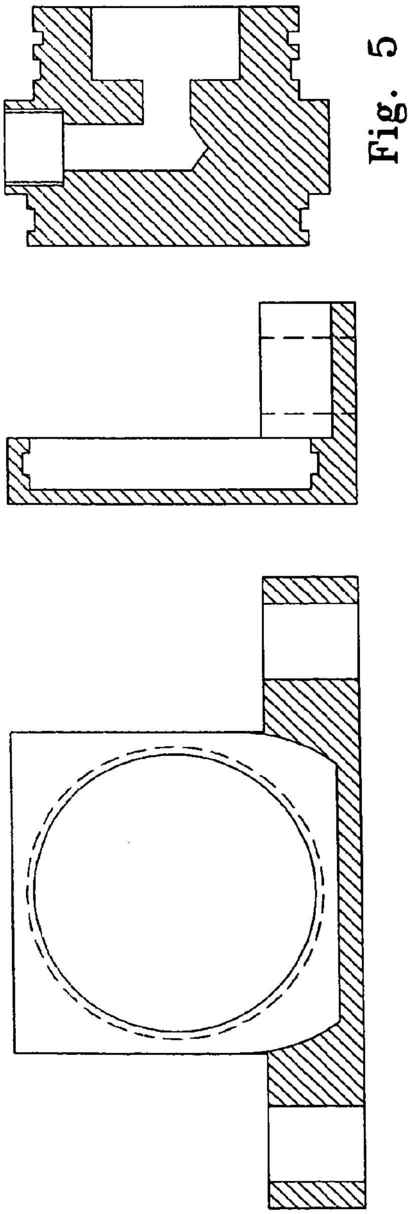
FIGS. 4 and 5 illustrate two different forms of embodiment of the cylinder according to the invention.

As shown in FIG. 2, when a head is inserted in the nozzle, the two parts 5 and 11 of the annular track on each section match perfectly.

Subsequently, roller bearings 13, or other similar means, are inserted through hole 12 in nozzle 2 and fill the space between the two annular half-tracks along the entire circumference of the cylinder.

As said roller bearings are dimensioned precisely, according to the size of the annular track, the head will be firmly secured to the nozzle once they have been inserted.

It is then sufficient to close hole 12 with a simple lid 14, such as a snap-on lid or threaded cap.

The invention offers considerable advantages.

The main one is the simplicity of the mechanism described above, which does not involve high manufacturing costs and facilitates the operations of installation and removal of the cylinder because special equipment is not required, as it is with the devices known to the prior art.

Moreover, the cylinders made according to the new technique also solve the problems of versatility from which the existing systems suffer, as described above.

In particular, with the new cylinders, both heads can be rotated without difficulty, e.g. to turn the unions that convey the fluid to the nozzle to the most convenient position, an operation which was previously impossible.

A further major advantage of this invention is that a variety of devices, such as plates, rings and brackets, can be fitted to the heads so that the cylinder can be used in a wide variety of applications; said devices can be connected to the heads with the same locking system as used to secure the heads to the nozzle, namely means, such as roller bearings or the like, inserted in an annular track made partly in the head and partly in the device that secures it to the cylinder.

Figure 4:
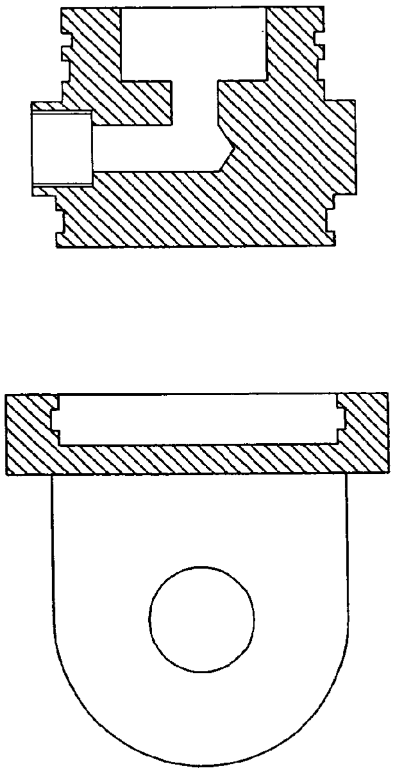

For example, if the method used to instal the cylinder in the unit in which it is used should change, it would be sufficient to remove the locking device and replace it with one suitable for the new application, with the major financial advantage that the entire cylinder does not need to be replaced. FIGS. 4 and 5 illustrate two such systems, designed to be attached to the respective heads, by way of example but not of limitation.

A number of variations on the same solution idea could also be devised. For example, nozzle 2 could be designed to be inserted into the heads, in which a suitable seating would be made. In this case, tracks 5 and 11 would be made in the inner wall of the heads and the outer wall of the nozzle respectively.

Instead of roller bearings, the heads could be locked by a helical spring, or a wire made of steel or other material suitable to be inserted in track 5-11, which will have a shape complementary to that of the wire.

The invention claimed is:

1. Cylinder for pressurised fluids, consisting of a cylindrical nozzle (2) and a pair of heads (3, 4) designed to be attached to the ends of said nozzle, wherein two annular grooves (5, 11) are made partly in the cylinder liner and partly in each of the two heads for the purpose of locking said heads, and that means (13) designed to be inserted into said grooves to lock said heads into position are fitted, wherein said locking means are constituted by roller bearings (13) which engage with the walls of said grooves (5, 11), preventing axial movements of said heads in relation to said nozzle (2).

2. Cylinder for pressurised fluids as claimed in claim 1, wherein the axis of said roller bearings is parallel to the axis of the nozzle.

3. Cylinder for pressurised fluids as claimed in claim 1, wherein said grooves (5, 11) are made partly on the inner surface of nozzle (2) and partly on the outer surface of a head element (6) which is inserted into said nozzle.

4. Cylinder for pressurised fluids as claimed in claim 1, wherein said grooves (5, 11) are made partly on the outer surface of nozzle (2) and partly on the inner surface of a head element (6) which fits around said nozzle.

5. Cylinder for pressurised fluids as claimed in claim 1, wherein said locking means (13) are inserted through a hole (12) matching annular tracks (5, 11),

6. Cylinder for pressurised fluids as claimed in claim 1, wherein said locking means are constituted by a wire inserted in said annular track.

7. Cylinder for pressurised fluids as claimed in claim 1, wherein said locking means are constituted by a helical spring inserted in said annular track.

8. Cylinder for pressurised fluids, consisting of a cylindrical nozzle (2) and a pair of heads (3, 4) designed to be attached to the ends of said nozzle, wherein two annular grooves (5, 11) are made partly in the cylinder liner and partly in each of the two heads for the purpose of locking said heads, and that means (13) designed to be inserted into said grooves to lock said heads into position are fitted, wherein a further annular half-track is fitted to the heads to allow additional devices to be connected to said heads and locked with the same system.

9. Cylinder for pressurised fluids as claimed in claim 8, wherein said grooves (5, 11) are made partly on the inner surface of nozzle (2) and partly on the outer surface of a head element (6) which is inserted into said nozzle.

10. Cylinder for pressurised fluids as claimed in claim 8, wherein said grooves (5, 11) are made partly on the outer surface of nozzle (2) and partly on the inner surface of a head element (6) which fits around said nozzle.

11. Cylinder for pressurised fluids as claimed in claim 8, wherein said locking means (13) are inserted through a hole (12) matching annular tracks (5, 11).

12. Cylinder for pressurised fluids as claimed in claim 8, wherein said locking means are constituted by a wire inserted in said annular track.

13. Cylinder for pressurised fluids as claimed in claim 8, wherein said locking means are constituted by a helical spring inserted in said annular track.

14. Cylinder for pressurised fluids, consisting of a cylindrical nozzle (2) and a pair of heads (3, 4) designed to be attached to the ends of said nozzle, wherein two annular grooves (5, 11) are made partly in the cylinder liner and partly in each of the two heads for the purpose of locking said heads, and that means (13) designed to be inserted into said grooves to lock said heads into position are fitted, wherein said locking means are constituted by ball bearings.

15. Cylinder for pressurised fluids as claimed in claim 14, wherein said grooves (5, 11) are made partly on the inner surface of nozzle (2) and partly on the outer surface of a head element (6) which is inserted into said nozzle.

16. Cylinder for pressurised fluids as claimed in claim 14, wherein said grooves (5, 11) are made partly on the outer surface of nozzle (2) and partly on the inner surface of a head element (6) which fits around said nozzle.

17. Cylinder for pressurised fluids as claimed in claim 14, wherein said locking means (13) are inserted through a hole (12) matching annular tracks (5, 11).

18. Cylinder for pressurised fluids as claimed in claim 14, wherein said locking means are constituted by a wire inserted in said annular track.

19. Cylinder for pressurised fluids as claimed in claim 14, wherein said locking means are constituted by a helical spring inserted in said annular track.

* * * * *